Dec. 27, 1932.  E. E. MOE  1,892,357

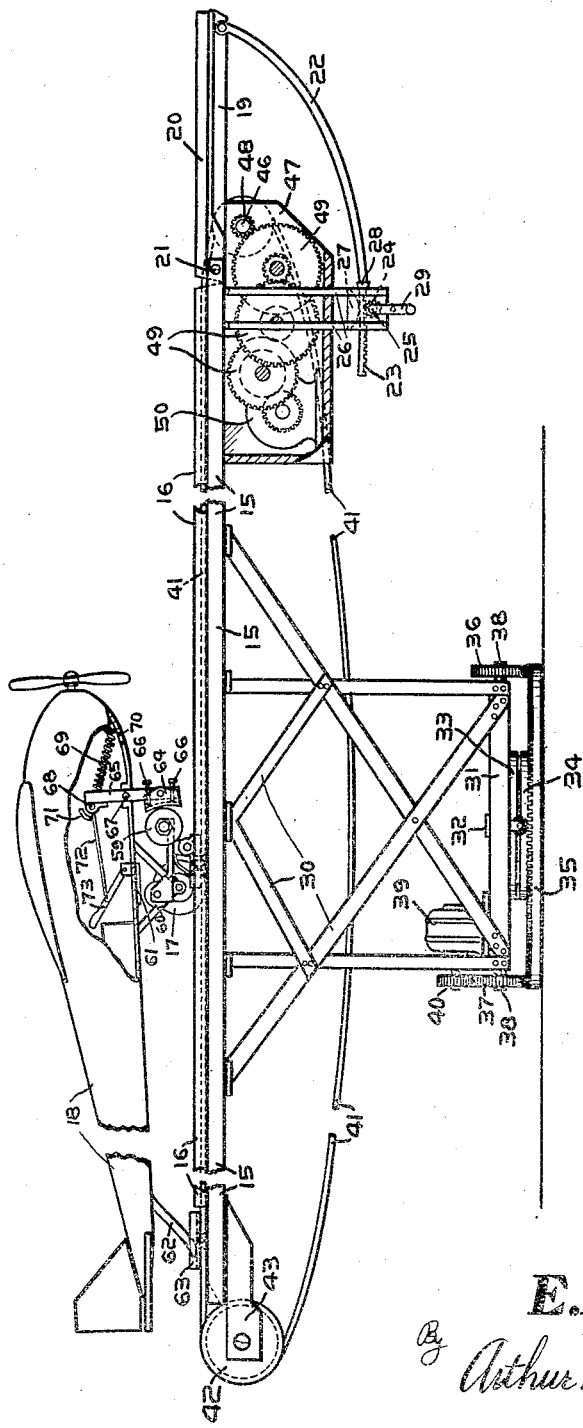

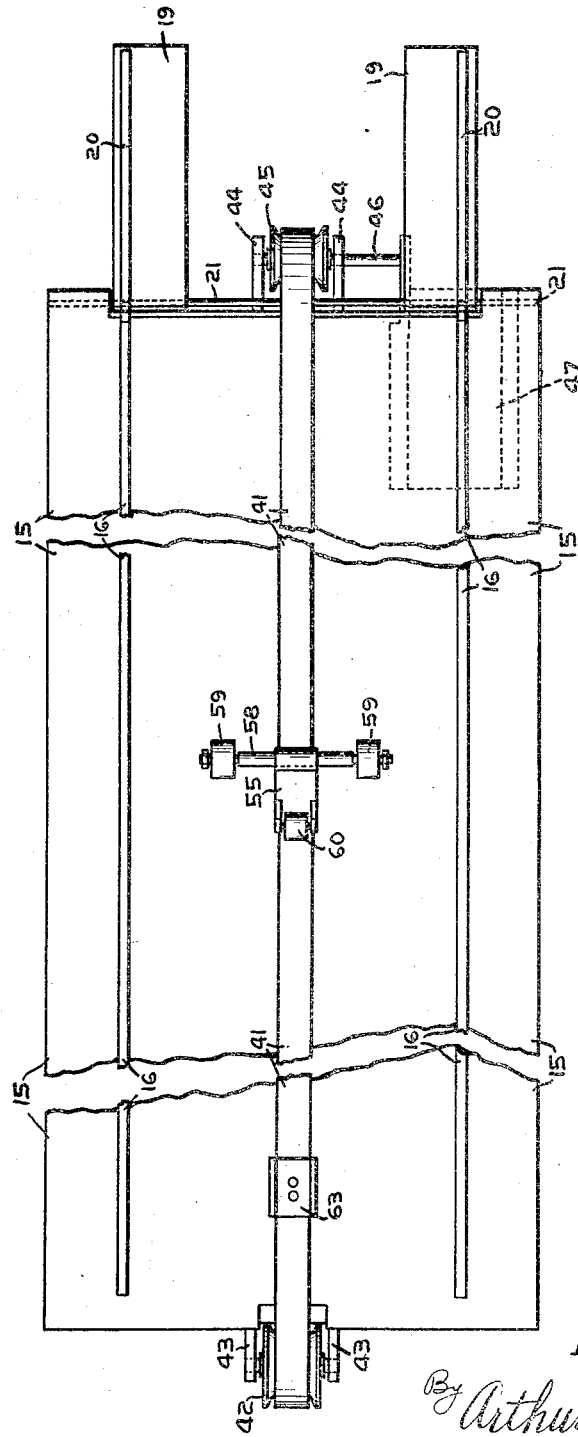

AIRPLANE CATAPULT

Filed April 27, 1931    5 Sheets-Sheet 3

Inventor
E. E. Moe
By Arthur H. Sturges
Attorney

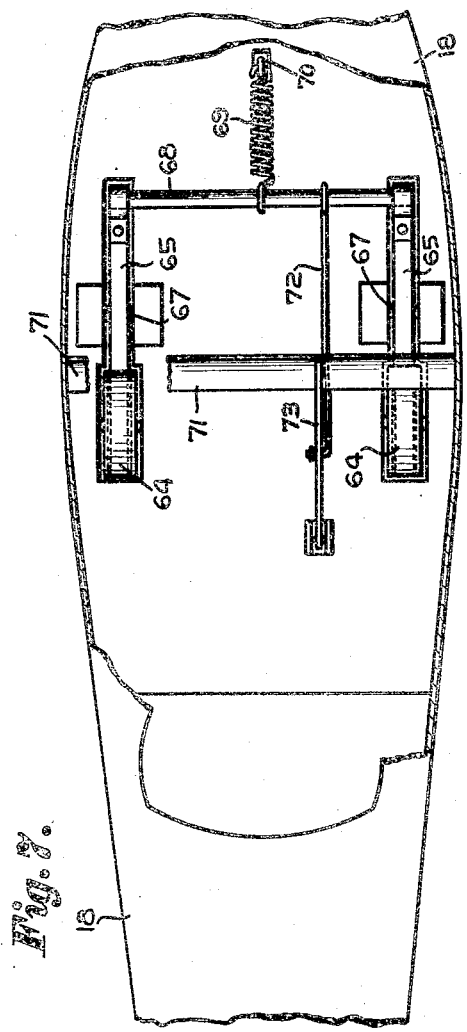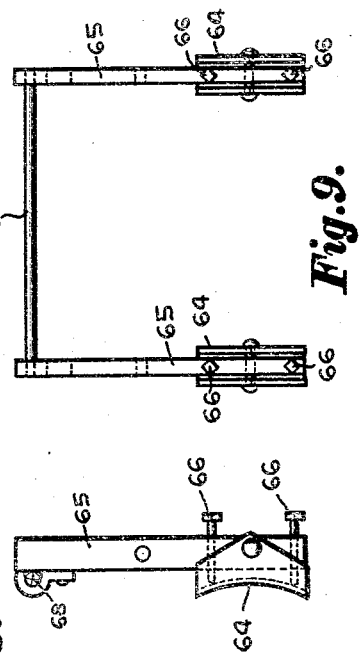

Dec. 27, 1932.  E. E. MOE  1,892,357
AIRPLANE CATAPULT
Filed April 27, 1931   5 Sheets-Sheet 5
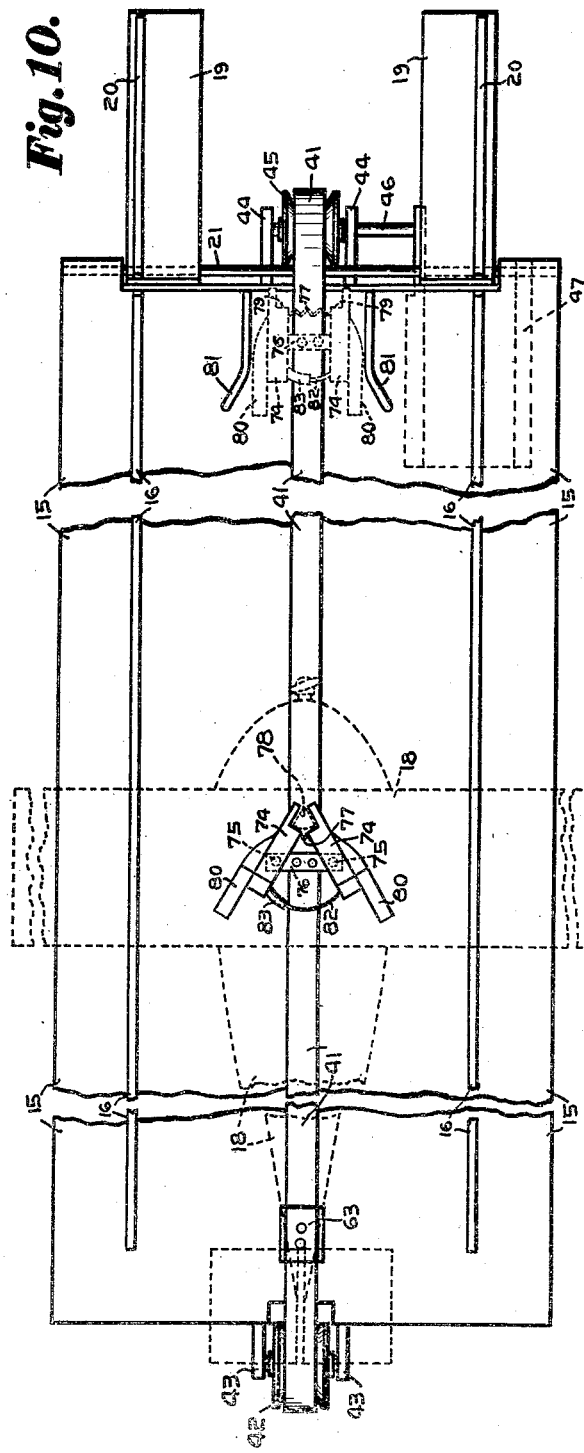
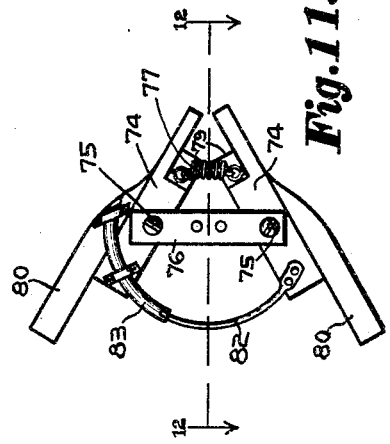
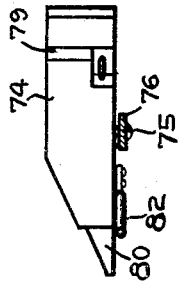
Inventor
E.E.Moe
By Arthur H. Sturges,
Attorney Patented Dec. 27, 1932

1,892,357

UNITED STATES PATENT OFFICE

EDWARD E. MOE, OF OMAHA, NEBRASKA

AIRPLANE CATAPULT

Application filed April 27, 1931. Serial No. 533,116.

The present invention relates to launching devices for airplanes and the like, and has for an object to provide a device which is of compact construction and which may be installed on a ship, landing field, the top of a building, or any other suitable support wherein it is desired to take off in an airplane or the like from a relatively small supporting surface.

Another object of the present invention is to provide a launching device embodying the above features and which is provided with means admitting of the same to be axially turned or adjusted so as to present the aircraft toward the wind to insure a proper take-off, and to also provide the device with means for imparting an upward thrust and a lifting thereof at the final stage of projecting the aircraft from the launching device.

The invention also aims at the provision of a launching device of this character which may be provided with means for regulating the speed of projection of the aircraft during the take-off of the same.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side elevation of a launching device constructed according to the present invention and showing an airplane in position thereon about to take-off, parts being shown broken away and in section.

Figure 2 is a top plan view of the launching device.

Figure 7 is a fragmentary sectional top plan view of the fuselage of an airplane equipped with the coupling attachment for co-operation with the launching device.

Figure 8 is a detail side elevation of the adjustable connecting arm.

Figure 9 is a front elevation of the same.

Figure 10 is a top plan view of a slightly modified construction of the launching device.

Figure 11 is a detail bottom plan view of the airplane engaging member, and

Figure 12 is a longitudinal central section taken through the same substantially on the line 12—12 of Figure 11.

Figure 4:
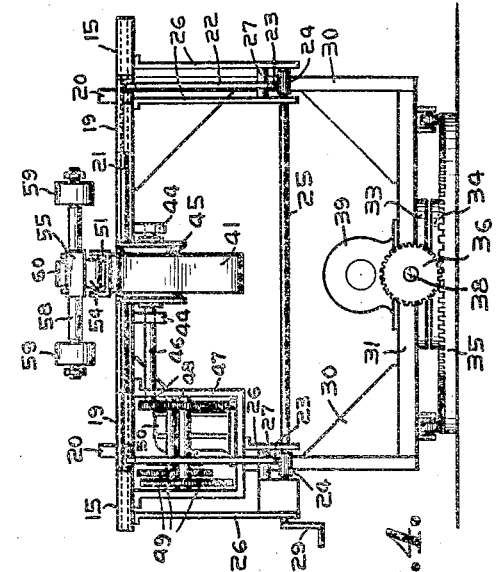
Figure 4 is an outer end elevation thereof.
Figure 3:
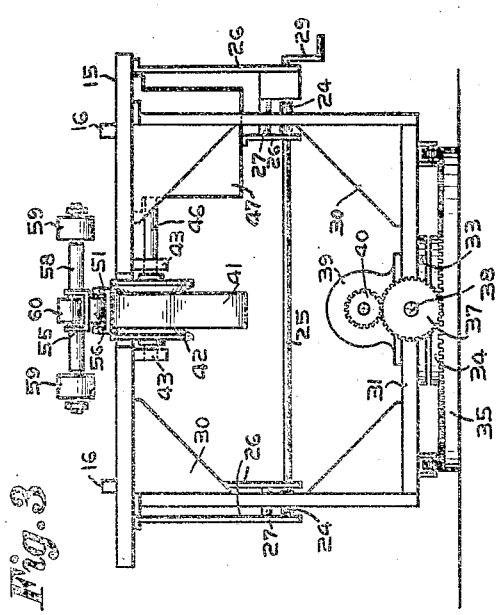
Figure 3 is an inner end elevation of the same.

Referring to the drawings, the device is provided with a platform or body portion 15 of suitable width and length and which on its upper surface carries a pair of spaced apart longitudinal guide rails 16 against the outer sides of which are adapted to travel the wheels 17 of the landing gear of an airplane 18 or the like.

At the forward end of the platform 15 is hingedly mounted a pair of extensions or tongues 19, and each tongue 19 carries an extension guide rail 20 adapted to align with the corresponding guide rail 16 so that the tongues 19 provide a continuation of the platform. The tongues 19 are of sufficient width to receive the wheels 17 thereon as the latter leave the forward end of the platform.

The inner ends of the tongues 19 are pivotally mounted upon a transverse rod 21 while the outer ends of the tongues are each provided with a downwardly and rearwardly curved brace arm 22 which has at its lower rear end rack teeth 23 intermeshing with pinions 24 fixed upon a transverse shaft 25. The shaft 25 is supported at opposite ends in a depending bracket 26 which is secured to the forward end of the platform 15. Guide blocks 27 are carried in the brackets 26 in spaced relation above the pinions 24 and slidably engage against the upper edges of the bracket arms 22 for holding the latter in intermeshing engagement with the pinions 24.

Each bracket arm 22 carries a stop collar 28 or the like adapted to engage the forward side of the adjacent bracket 26 to limit the downward swinging movements of the tongues 19. A handle 29 is carried upon one end of the shaft 25 for turning the latter to raise and lower the bracket arms 22 within the limit of the stops 28.

The platform 15 is supported upon a frame 30 which may be of any suitable construction and which may be substantially rectangular as shown and provided at its lower end with a base plate 31 pivotally mounted at its central portion upon a pivot pin or post 32 about which the frame 30 is adapted to turn. The base plate 31 carries at its underside a supporting ring or plate 33 of circular form adapted to seat upon a correspondingly shaped supporting ring 34 mounted upon the foundation or ground and about which is concentrically disposed an annular rack 35.

The frame 30 carries at opposite ends gear wheels 36 and 37 which are carried on a longitudinal shaft 38 and which mesh with the annular rack 35. The frame 30 carries a motor 39 having a driving pinion 40 which meshes with the gear wheel 37 for turning it and swinging the frame 30 around its pivot 32 by the travel of the gear wheel 37 over the annular rack 35.

An endless belt 41 is trained lengthwise over the upper side of the platform 15 and extends downwardly about the opposite ends of the platform and is returned beneath the same. The belt 41 is supported in the rear end of the device upon an idler pulley or roller 42 suitably flanged to retain the belt 41 in proper alignment. The pulley 42 is mounted in bracket arms 43 which project rearwardly from the underside of the platform 15 to dispose the upper side of the pulley 42 substantially in alignment with the upper surface of the platform 15.

The forward end of the platform 15 is provided with a second pair of bracket arms 44 in which is supported a forward pulley 45, the latter being secured upon a shaft 46 which projects beyond one side of the bracket arms 44 and into a suitable gear casing 47. The inner end of the shaft 46 carries a pinion 48 which meshes with a train of gears 49 of any desired number and proportionate sizes to impart a relatively high speed of travel to the endless belt 41. The train of gears 49 is driven by an electric motor 50 suitably mounted in the casing 47 and which is adapted to be controlled through a suitable rheostat or controller operable from a suitable point of advantage which admits of the desired increase in the speed of operation of the belt 41.

Figure 6:
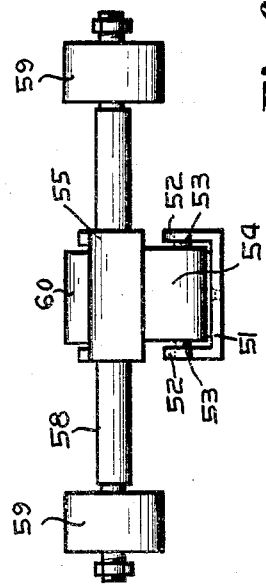
Figure 6 is a front elevation of the same.
Figure 5:
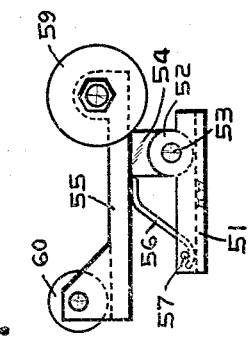
Figure 5 is a detail enlarged side elevation of the airplane engaging member.

The belt 41 is provided at a suitable point across its outer face with an airplane engaging member, shown to advantage in Figures 5 and 6. This member comprises a channel strip 51 embodying a base plate adapted to be riveted or otherwise suitably secured to the belt 41, and which is of relatively short length so that the belt may ride over the opposite pulleys 42 and 45 during the operation of the belt. The opposite longitudinal edges of the base plate 51 are upturned and provided near one end with enlarged lugs 52 for supporting a transverse pivot pin 53, the latter pivotally engaging an arm 54 which extends downwardly from the forward end of a tilting frame 55.

The frame 55 is yieldingly supported in position parallel to the base plate 51 by means of a leaf spring 56 which may be secured beneath a pin 57 carried by the upturned flanges of the base plate 51, the leaf spring being bent upwardly and terminating against the underside of the frame 55 adjacent the arm 54 thereof.

The frame 55 carries at its forward end a transverse shaft 58 which extends beyond the opposite sides of the frame 55 and which carries on its outer end portions contact rollers 59 adapted to engage a portion of the airplane 18 to carry the same forward when the belt is operated.

The rear end of the tilting frame 55 is provided with a relatively broad roller 60, and the airplane 18 is provided at its underside with a bearing plate 61 which registers over the roller 60 when the plane is in position to be launched so that as the airplane engaging member is turned downwardly over the front pulley 45, the roller 60 rises and strikes the wear plate 61 to impart a final and upward thrust to the airplane 18 as it leaves the launching device.

The airplane 18 is provided with a tail skid 62 in the usual manner, and the belt 41 is provided upon its outer surface and at a point suitably distanced from the engaging member with a guide 63 for the tail skid, the guide, as shown in Figures 1 and 2 particularly, comprising a channel strip riveted or otherwise secured to the belt 41 and within which rests the lower end of the tail skid 62 for holding the airplane 18 in true longitudinal alignment with the belt 41. Of course the belt may be provided with any suitable number of the guides 63, and the guide as shown may be adjustably mounted on the belt so as to bring the guide 63 in proper position beneath the tail skid 62, depending upon the range of the airplane 18.

The airplane 18 is provided at a suitable point, preferably in advance of the landing gear thereof, with co-acting means for engagement with the airplane engaging member on the belt for coupling the airplane thereto when desired. This co-acting means comprises a pair of shoes 64 shaped at their bearing surfaces to engage the contact rollers 59 and which are pivotally mounted upon the lower ends of a pair of arms 65 and adjustable thereon by means of set screws 66, as best seen in Figures 8 and 9.

The arms 65 are pivotally mounted intermediate their ends on a transverse rod 67 mounted in the bottom of the airplane 18 so that the upper portions of the arms 65 extend up into the fuselage or body of the airplane.

A cross rod 68 connects together the upper ends of the arms 65 and is connected to one end of a spring 69 which has its other end anchored on a hook 70 or the like in the forward part of the airplane 18.

A transverse stop bar 71 is carried in the body of the airplane 18 in position to be engaged by the rod 68 and the upper ends of the arms 65 when the arms are swung into a substantially vertical position, as shown in Figure 1. A connecting rod 72 is pivoted at one end to the cross rod 68 and at its other end to a hand lever 73 pivotally mounted in the bottom of the airplane 18 and adapted to be drawn rearwardly by the pilot for swinging the arms 65 into vertical position for use.

In operation, the device is installed in a desired manner upon a ship, on the roof of a building, or may be countersunk in a landing field or the like so that the platform 15 is disposed in substantially a horizontal position. The airplane 18 is taxied or otherwise moved upon the platform 15 with the wheels 17 adjacent the guide rails 16 and then the belt 41 is driven to bring the engaging device and the guide 63 beneath the airplane 18, the operator swinging the lever 73 backwardly to move the arms 65 into vertical position and bring the contact shoes 64 into position of use for engaging the contact rollers 59. The apparatus and airplane are now in adjustment for launching the airplane.

The operator in charge of the motor 50 may now start the motor and gradually increase the speed thereof so as to obtain the necessary speed of the belt for carrying the airplane forwardly through the relatively short distance of the device and with a speed sufficient to enable the airplane to be sustained incident to the counter air pressure. The airplane 18 is carried along the platform 15 with the speed increased and the tongues 19 may be adjusted so as to extend upwardly to a slight angle so that as the airplane leaves the platform 15 it will be elevated or thrown upwardly as it is projected into the air. This action is assisted by means of the engaging device which carries the roller 60 at a point rearwardly of the pivot 53 of the engaging device so that the roller 60 will be suddenly thrown upward against the plate 61 and will thus force the airplane 18 upwardly with a final thrust to assist it in rising from the platform and over the tongues 18.

As soon as the airplane 18 is released from the belt 41 the arms 65 are automatically swung into position up into the bottom of the airplane 18, as shown in Figure 7, by the action of the spring 69 so that the shoes 64 and the arms 65 are out of the way and do not offer any head resistance.

With reference now to the modification shown in Figures 10, 11 and 12, the belt 41 is provided with a modified construction of engaging member and which comprises a pair of jaws 74 which intermediate their ends are pivotally mounted at 75 upon a cross bar 76. The cross bar 76 is riveted or otherwise suitably secured to the belt 41. The jaws 74 are recessed at their forward ends to accommodate the opposite ends of a spring 77 normally tending to close the forward ends of the jaws together, and the forward ends of the jaws are adapted when closed to engage about a correspondingly shaped projection 78 carried on the underside of the airplane 18, as shown in Figure 10. The recessing of the jaws 74, as shown in Figure 11, provide shoulders 79 against which the pin 78 seats for carrying the airplane forwardly with the engaging member on the belt 41.

Each jaw 74 is provided at its rear end with an arm 80, and the arms 80 diverge rearwardly from the engaging member and are adapted to engage and be swung inwardly by a pair of releasing rails 81 secured upon the upper side of the platform 15 at the forward end thereof. The rails 81 have their forward and intermediate portions substantially in parallel relation while the rear ends thereof flare backwardly to receive the arms 80 and gradually swing the latter toward each o'her as shown in dotted lines in Figure 10. This action opens the forward ends of the jaws and releases the pin 78 so that the airplane is free to move forwardly under its own power and momentum.

In order to maintain the jaws 74 in relative alignment, one of the jaws is provided with a curved bar 82 suitably fixed upon the jaw and received at its outer end in a correspondingly curved tube 83 providing a guide for the rod 82. The tube 83 is secured in fixed relation upon the opposite jaw 74 so that the rod 82 has bearing in the sleeve at all times to hold the jaws against relative movement out of their common plane.

It is obvious that various changes and modifications may be made in the details of construction and design of the above specifically described embodiment of this invention without departing from the spirit thereof, such changes and modifications being restricted only by the scope of the following claims:

What is claimed is:—

1. A launching device for airplanes, comprising an elongated platform, means for adjustably supporting the platform, a belt arranged to traverse the upper face of the platform, engaging means carried by the belt for engaging an airplane on the platform, and a pair of deflecting tongues hingedly mounted upon the forward end of the platform for receiving the airplane as it leaves the platform to direct the airplane upwardly as it is launched.

2. A launching device for airplanes, comprising a platform, a movable member carried by the platform and having means for engaging an airplane to move the airplane lengthwise of the platform, a pair of tongues hinged upon the forward end of the platform to provide continuations thereof to receive the airplane, and means for adjustably supporting said tongues in inclined position with respect to the upper surface of the platform for launching the airplane in the desired direction from the platform.

3. A launching device for airplanes, comprising a platform, an endless belt traversing the platform, means for operating said belt, engaging means carried by the belt, a contact member adapted to be mounted on an airplane and arranged to co-act with said engaging means on the belt, and means connected to the contact means and adapted for mounting in the airplane for normally urging the contact means into position out of the way subsequent to the launching of the airplane.

4. A launching device for airplanes, comprising a platform, means for rotatably supporting the platform, rollers at opposite ends of the platform, an endless belt support on said rollers and traversing the upper surface of the platform, means for operating the belt, engaging means carried by the belt, contact means adapted to be mounted on an airplane, means for moving said contact means into position for co-operation with said connecting means on the belt, said contact means including a spring member for normally retracting the contact means into the airplane, and a hand lever for projecting the contact means after positioning on the platform.

5. A launching device for airplanes, comprising a platform, an endless belt on the platform, airplane engaging means carried by the belt, contact means adapted to be mounted on an airplane for engagement with the engaging means of the belt, said engaging means of the belt including an outwardly operating thrust member arranged to project downwardly at the downward turn of the belt in leaving the platform to effect an upward thrust on the airplane as the latter leaves the platform.

6. A launching device for airplanes, comprising a platform, an endless belt on the platform, means for operating the belt, a base member secured to the belt, a plate pivotally mounted on the base member near the forward end thereof, a pair of rollers carried upon the forward end of said plate for engagement with an airplane to carry the same with the belt, spring means for normally holding the plate in parallel relation to the base member, and a thrust member carried upon the rear end of the pivoted plate and adapted to project upwardly against the bottom of the airplane upon the forward down turning of the belt to effect an upward thrust on the airplane as it leaves the platform.

7. A launching device for airplanes, comprising a platform, an endless belt on the platform, a pair of clamping jaws pivotally mounted on the belt and normally urged into closed position, a post adapted to be mounted on an airplane for interlocking engagement with the jaws when closed, rearwardly diverging arms carried by the jaws, and a pair of contact rails mounted on the forward end of the platform and flaring at their rear ends for receiving said arms therebetween to move the arms together and open said jaws.

8. A launching device for airplanes, comprising a platform, a belt on the platform, a pair of normally closed clamping jaws carried by the belt adapted to engage a depending portion of an airplane, and co-operating jaw opening means carried by the jaws and the forward end of the platform for opening the jaws as the airplane leaves the platform.

9. A launching device for airplanes, comprising an elongated and adjustable platform adapted to receive an airplane thereon, a belt mounted for movement lengthwise over the platform, airplane engaging means yieldingly mounted on said belt, said means comprising a base plate secured to the belt and having upturned lugs, a tilting frame having a downwardly extending arm and pivotally engaging the lugs, a leaf spring secured between the base plate and the frame for yieldingly supporting said frame, a pair of rollers carried on the forward end of said plate for engagement with an airplane to carry the same with the belt, co-operating contact means adapted to be mounted on an airplane and disposed to be in the path of said engaging means of the belt, and means for driving said belt.

In testimony whereof, I have affixed my signature.

EDWARD E. MOE.